United States Patent [19]

Jones et al.

[11] Patent Number: 4,506,181

[45] Date of Patent: Mar. 19, 1985

[54] PERMANENT MAGNET ROTOR WITH COMPLETE AMORTISSEUR

[75] Inventors: Donald W. Jones, Burnt Hills; Timothy J. E. Miller, Schenectady, both of N.Y.

[73] Assignee: General Electric Company, Schenectady, N.Y.

[21] Appl. No.: 585,474

[22] Filed: Mar. 2, 1984

[51] Int. Cl.³ .......................................... H02K 21/12
[52] U.S. Cl. .................................... 310/156; 310/42; 310/211
[58] Field of Search ........ 310/156, 211, 212, 216–218, 310/261, 262, 264, 265; 324/42, 162, 146

[56] References Cited

U.S. PATENT DOCUMENTS

| | | | |
|---|---|---|---|
| 2,418,980 | 4/1947 | Morrill | 310/156 |
| 2,863,077 | 12/1958 | Morrill | 310/156 |
| 2,985,779 | 5/1961 | Flaningham et al. | 310/156 |
| 3,492,520 | 1/1970 | Yates | 310/156 |
| 4,127,786 | 11/1978 | Volkrodt | 310/156 |
| 4,139,790 | 2/1979 | Steen | 310/212 |
| 4,393,320 | 7/1983 | Anderson | 310/217 |
| 4,464,596 | 8/1984 | Miller et al. | 310/156 |

Primary Examiner—R. Skudy
Attorney, Agent, or Firm—Mark L. Mollon; James C. Davis, Jr.; Marvin Snyder

[57] ABSTRACT

A rotor for a permanent magnet machine comprises laminated pole pieces held in position by interpolar nonmagnetic clamp pieces bolted to a solid rotor core having central portions with a polygonal cross section. Magnets are situated between the pole pieces and the faces of the central portion of the rotor and held in place by the clamping of the pole pieces. Pole piece bars are situated in axial extending apertures circumferentially arranged at the periphery of the pole pieces. Clamp piece bars are situated in channels in the clamp pieces. End rings electrically and structurally connect the clamp piece bars and pole piece bars at either axial end of the rotor forming a uniformly distributed starting cage.

4 Claims, 6 Drawing Figures

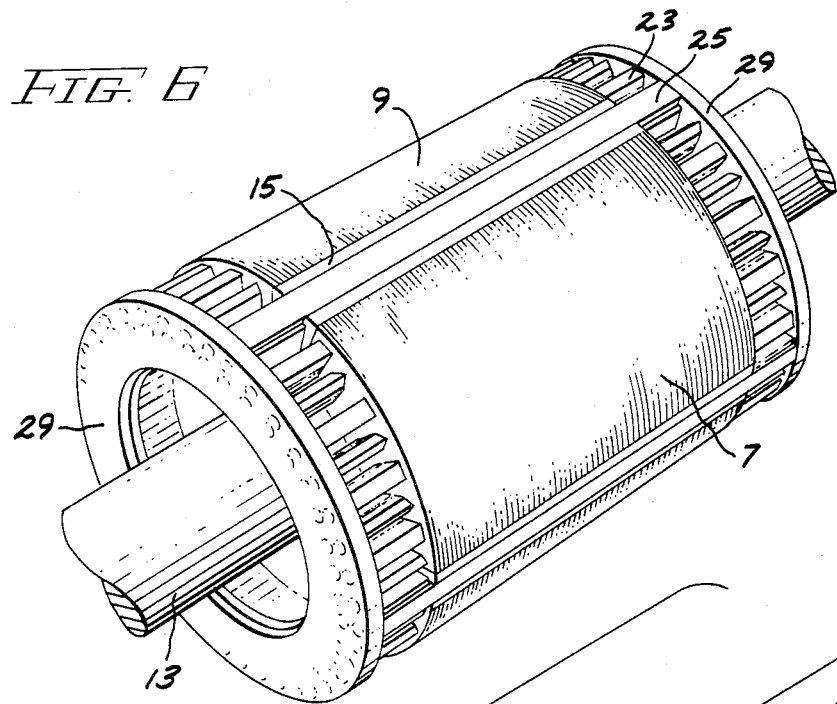
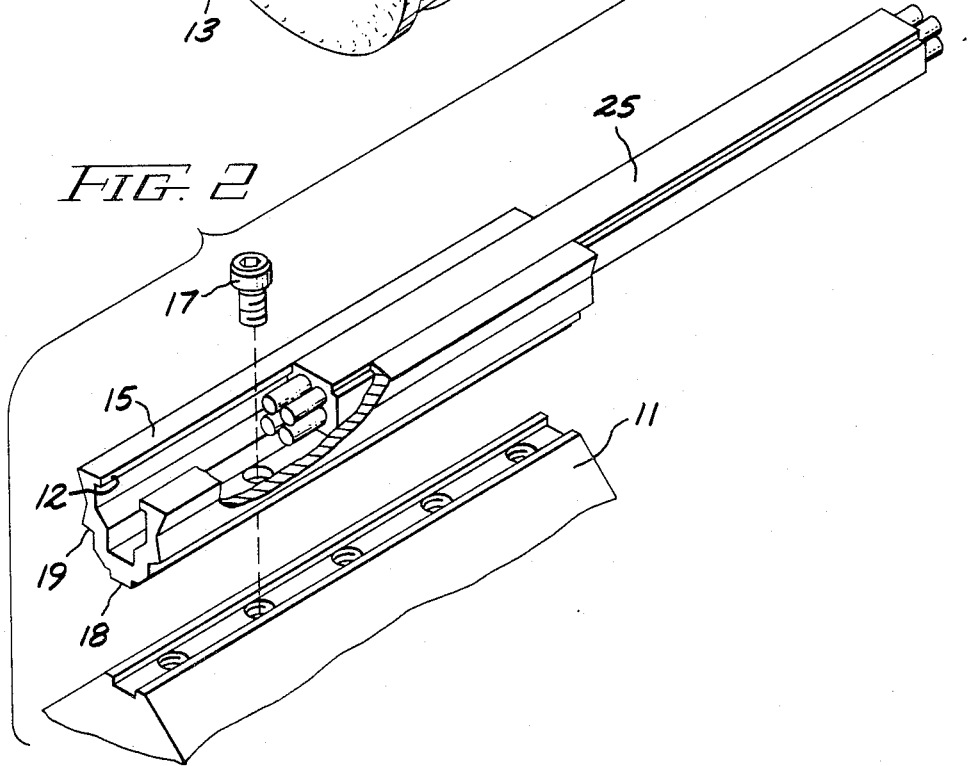

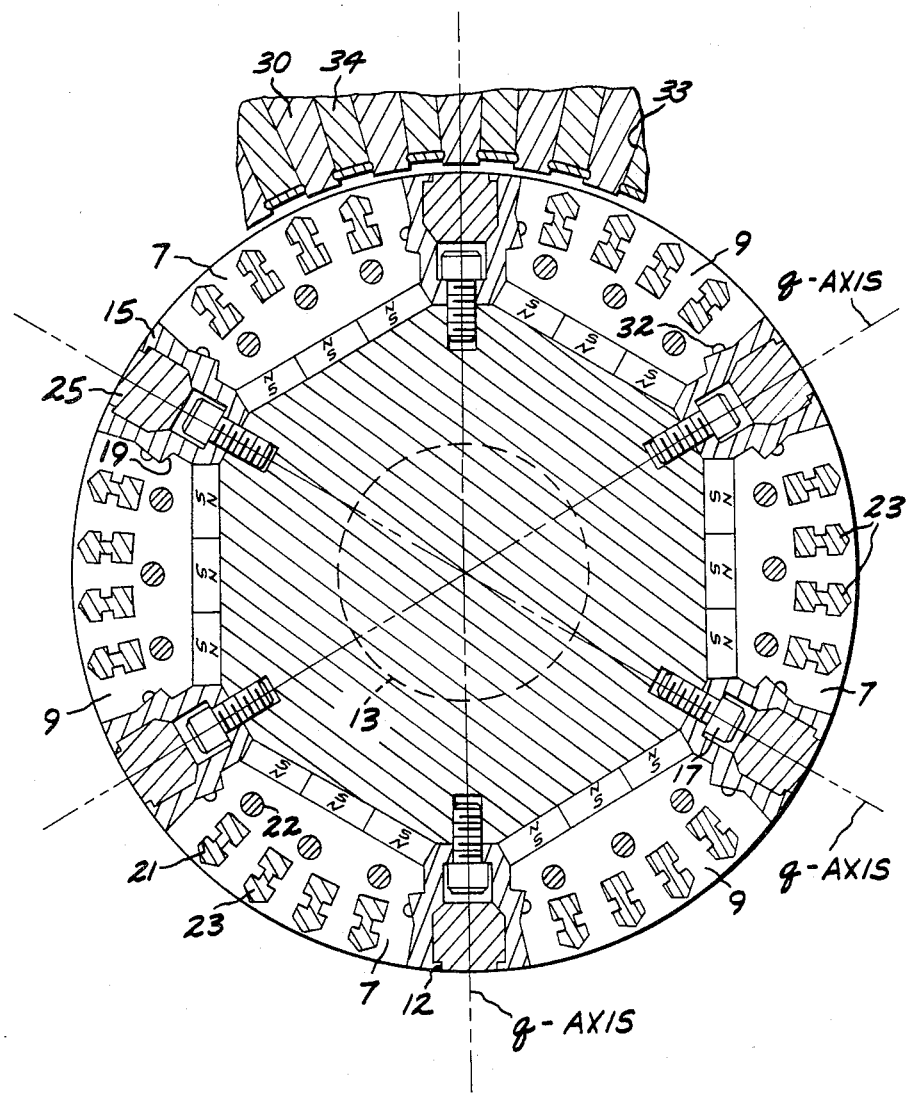

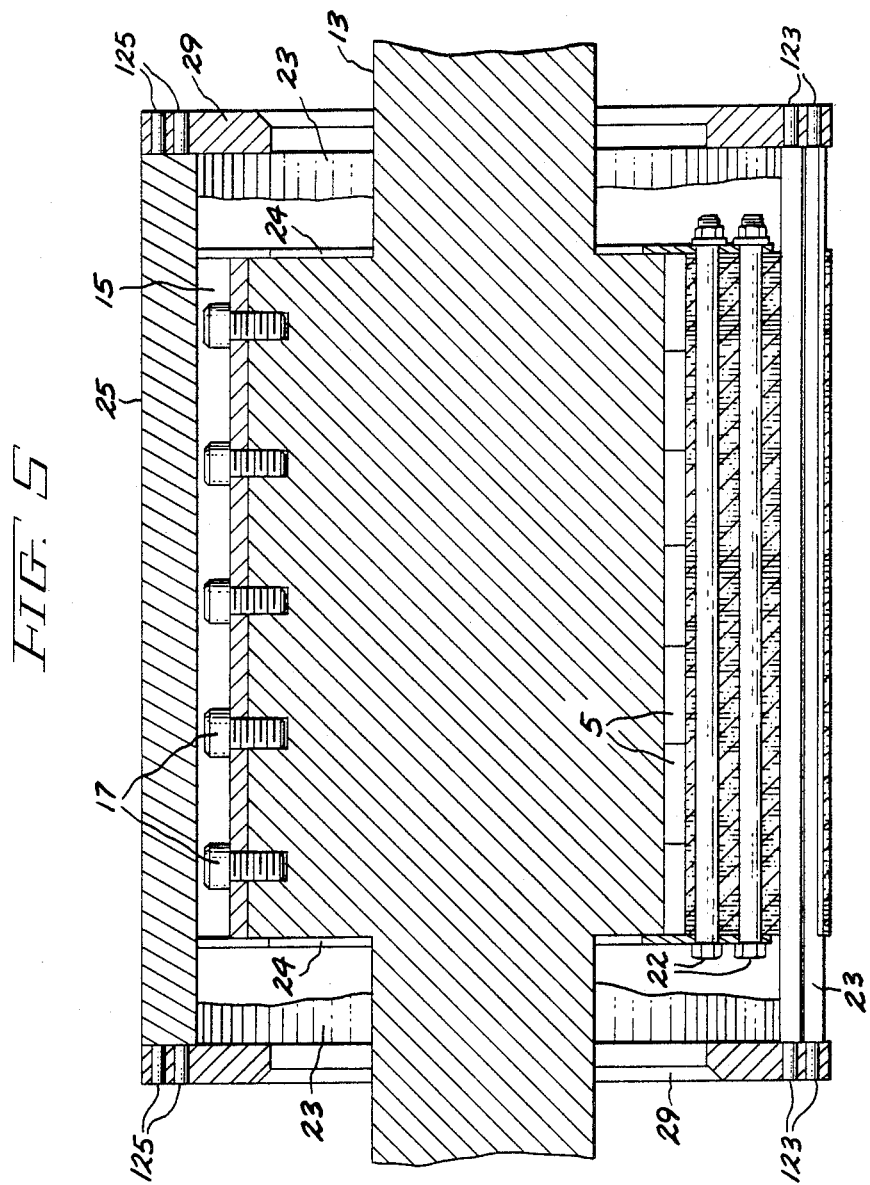

PERMANENT MAGNET ROTOR WITH COMPLETE AMORTISSEUR

BACKGROUND OF THE INVENTION

This invention relates to interior permanent magnet alternating current dynamo-electric machines and more particularly to rotors for a.c. dynamo-electric machines with interior permanent magnets and a complete amortisseur.

To build a permanent magnet excited motor with line start capability basically calls for the magnets to be buried under the poles which also accept the starting cage bars. The option then exists to mount the magnets with their direction of magnetization in the radial direction, or mount them in a flux squeezing orientation as has been used in high power density machines. The flux squeezing magnet arrangement (rectangular magnets arranged radially, with the direction of magnetization circumferentially oriented, for example) generally results in high magnet leakage flux. Also, in some cases a shaft of nonmagnetic material is required which, from a cost point of view is not acceptable in a commercial motor.

Rotors for interior permanent magnet line start machines are typically fabricated with a stack of circular unitary laminations, with the poles connected by thin saturating bridges. A disadvantage of the thin bridges is that they short out a predetermined flux level and represent a path for flux leakage in the rotor. Starting cage bars are located in slots circumferentially situated about the periphery of the laminations. This type of construction typically has a limitation of approximately 25 hp at 1800 rpm due to a limit on the peripheral speeds attainable. The limit is determined by the tensile strength of the saturating bridges. If the bridges are made thicker they short out more magnet flux, decreasing the machine efficiency. This conflict becomes more acute as machine size increases.

Interior permanent magnet motors of 25-300 hp capability shown, for example, in copending application Ser. No. 536,607 filed Sept. 26, 1983, now U.S. Pat. No. 4,464,596 and assigned to the instant assignee, typically have laminations divided into multiple pole sections which are clamped to the rotor core by clamping pieces situated along the quadrature axis. If the starting cage bars are located only in the laminated pole piece sections, and not in the interpolar spaces, a non-uniformly distributed starting cage results. This nonuniformity results in torque oscillations at asynchronous speeds, preventing smooth starting performance. A nonuniformly distributed starting cage could also prevent synchronization by limiting the motor speed achieved under load due to torque dips at selected speeds, such as at half speed (Goerges' phenomenon).

It is an object of the present invention to provide a rotor for an interior permanent magnet machine of the 25-300 hp range having a uniformly distributed starting cage.

It is a further object of the present invention to provide a rugged permanent magnet rotor that is convenient to manufacture, particularly in small lots.

It is a still further object of the present invention to provide a permanent magnet excited, high efficiency synchronous motor with line start capability, in the same frame size as comparable high efficiency induction motors.

It is another object of the present invention to provide a rotor for an interior permanent magnet machine utilizing a complete amortisseur suitable for use in a generator.

It is yet another object of the present invention to provide a rotor for an interior permanent magnet machine capable of being run by an adjustable frequency, adjustable voltage inverter.

SUMMARY OF THE INVENTION

In one aspect of the present invention, a rotor for a permanent magnet machine is provided having a plurality of north and south arcuately shaped pole pieces of flux conducting material. A shaft of flux conducting material having an axially central portion with a generally polygonal cross section has magnet means situated adjacent each of the faces of the polygonal cross section. The pole pieces are situated adjacent the magnet means with the north and south pole pieces alternately distributed circumferentially about the central portion of the shaft. The magnet means are polarized so that north seeking faces of the magnet means are adjacent the north pole pieces and the south seeking faces of the magnet means are adjacent the south pole pieces. Clamp means of nonmagnetic material are situated between adjacent north and south pole pieces so that the central portion of the shaft, magnet means and the clamp means form a cylinder. The clamp means define an axially extending void therethrough and the pole pieces define axially extending slots circumferentially situated about the periphery of the cylinder. Fastening means extend through the clamp means into holes formed in the corners of the central portion of the shaft. The clamp means have inclined surfaces engaging matching surfaces on the pole pieces to force the pole pieces toward the central portion of the shaft and thereby apply compressive force on the magnets when the fastening means are tightened. Pole piece bars of current conducting material are situated in the axially extending slots. Clamp piece bars of current conducting material are situated in the axially extending void defined by the clamp means. An end ring of current conducting material electrically joins the pole piece bars and clamp piece bars at one axial end of the cylinder and another end ring of current conducting material electrically joins the pole piece and clamp bars at the other axial end of the cylinder to form a complete amortisseur.

DESCRIPTION OF THE DRAWING

While the specification concludes with claims particularly pointing out and distinctly claiming the present invention, the objects and advantages can be more readily ascertained from the following description of preferred embodiments when used in conjunction with the accompanying drawing in which:

FIG. 2 is an exploded view of clamping means, a clamp piece bar and a section of the central portion of the shaft, employed in the rotor of the invention;

FIG. 4 is a sectional end view of an interior magnet six pole rotor with a starting cage in accordance with the present invention;

FIG. 5 is a side view of the rotor of FIG. 1 along the lines 5—5; and

FIG. 6 is a perspective view of an interior magnet four pole rotor with a starting cage in accordance with the present invention.

DETAILED DESCRIPTION OF THE INVENTION

Figure 1:
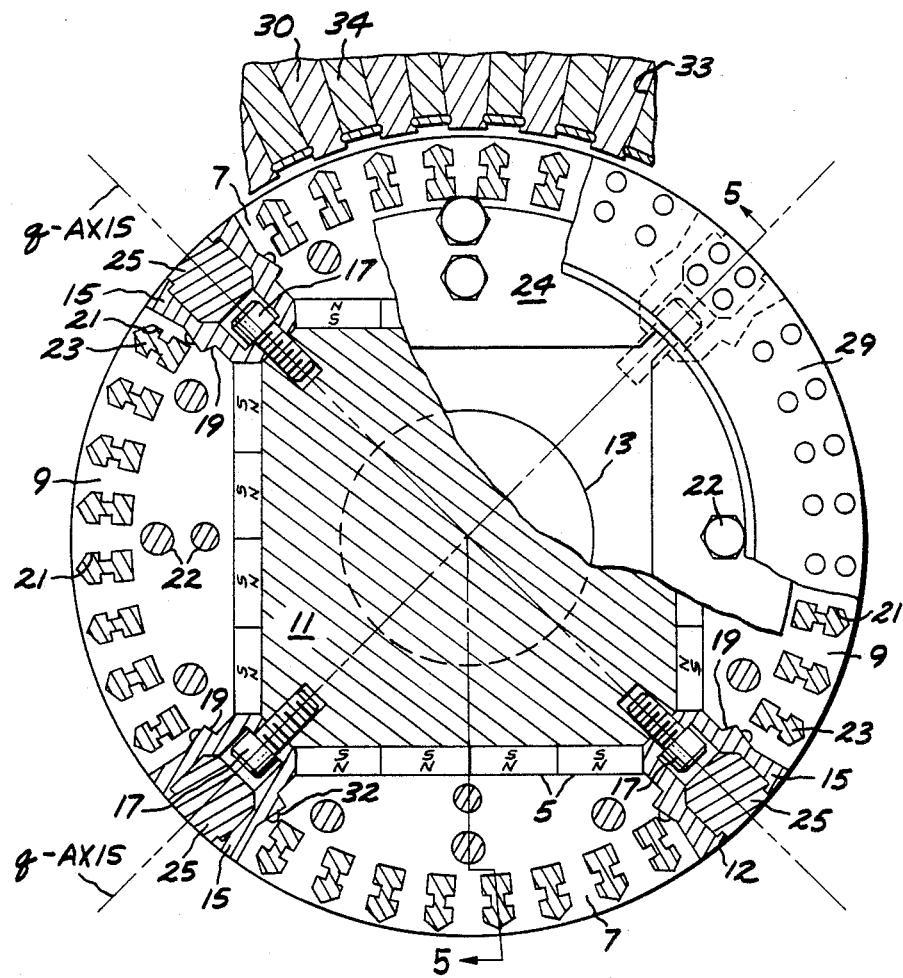
FIG. 1 is an end view partially in section of an interior magnet four pole rotor with a starting cage in accordance with the present invention.

Referring now to the drawing in which like reference numerals indicate like elements throughout and in particular to FIG. 1 thereof there is shown a four pole permanent magnet rotor for a line-start motor or generator. Magnets 5 which can comprise small blocks of magnetic material or a single piece of magnetic material are situated between the inner faces of north and south pole pieces 7 and 9 respectively and the sides of an axially central core portion 11 of a shaft 13 of magnetic material such as steel. The axially central core portion of the shaft, as used in a four pole machine, has a generally square cross section. Magnets 5 are preferably samarium cobalt magnets, but other magnet material such as ferrite, or other rare earth alloys can be used. The magnets 5 are oriented so that the north seeking faces of the magnets 5 are adjacent to the north pole pieces 7 and the south seeking faces of the magnets 5 are adjacent to the south pole pieces 9. Each of the pole pieces is made up of a stack of laminated magnetic steel sheets. The plane of the laminations is perpendicular to the axial direction. The pole piece laminations are insulated from one another to minimize power losses and heating caused by tooth-ripple flux pulsations. The laminations can be insulated from one another by magnetic oxide formed for example, by steam blueing.

Nonmagnetic clamp pieces 15 made from austenitic stainless steel, for example, fabricated by machining from approximate shape after extrusion or rolling, are situated between north and south pole pieces 7 and 9 along the quadrature or interpolar axes to force the north and south pole pieces toward the shaft and thereby apply clamping force to the magnets. The clamp pieces extend the entire stacked length in the axial direction. The quadrature axis is defined as a direction in the radial plane along which the permanent magnets produce no magnetization, and which normally coincide with the longitudinal plane midway between adjacent poles. The clamp pieces 15 are drawn toward the center of the rotor by bolts 17, preferably nonmagnetic, which extend along the quadrature axis through apertures in the clamp pieces 15 which communicate with threaded holes in the core portion of the shaft. Each clamp piece has an extending projection 18 which runs axially and fits into an alignment slot in the corner of the core portion of the shaft to align the assembly and to help transmit torque from the pole pieces, through the clamp pieces to the shaft. The corners of the core portion of the shaft have axially spaced radially extending threaded bolt holes. The bolt holes, alignment slot and clamp piece projection can be seen in FIG. 2. Referring again to FIG. 1 the clamp pieces have inclined surfaces 19 which engage corresponding inclined surfaces on the pole pieces, which force the pole pieces towards the shaft when the bolts are tightened.

The laminated pole pieces define double cage slots 21 which extend axially through the pole pieces. The slots are located near the periphery of the rotor. Pole piece bars 23 of current conducting material such as aluminum, are positioned in the slots. Other current conducting material which could be used are copper or brass. The laminated pole pieces also define axial bolt holes through which axial through-bolts 22 hold nonmagnetic end plates 24 of austenitic stainless steel, for example, which prevent axial movement of the magnets. Clamp pieces 15 define an axial channel with a narrowed opening in which clamp piece bars 25 of current conducting material are situated and held in place against centrifugal force by the shoulders 12 of clamp pieces 15. The clamp piece bars can be fabricated by machining aluminum stock. Alternatively, the clamp piece bars can be drawn or extruded to approximately the final shape and then machined if necessary. The cross-sectional area of the clamp piece bars in the embodiment of FIG. 1 is approximately equal to the area of two pole piece bars 23 in order to effect a substantially uniform peripheral distribution of induced currents during starting. The rotor of FIG. 1 is shown, in perspective, in FIG. 5.

Figure 3:
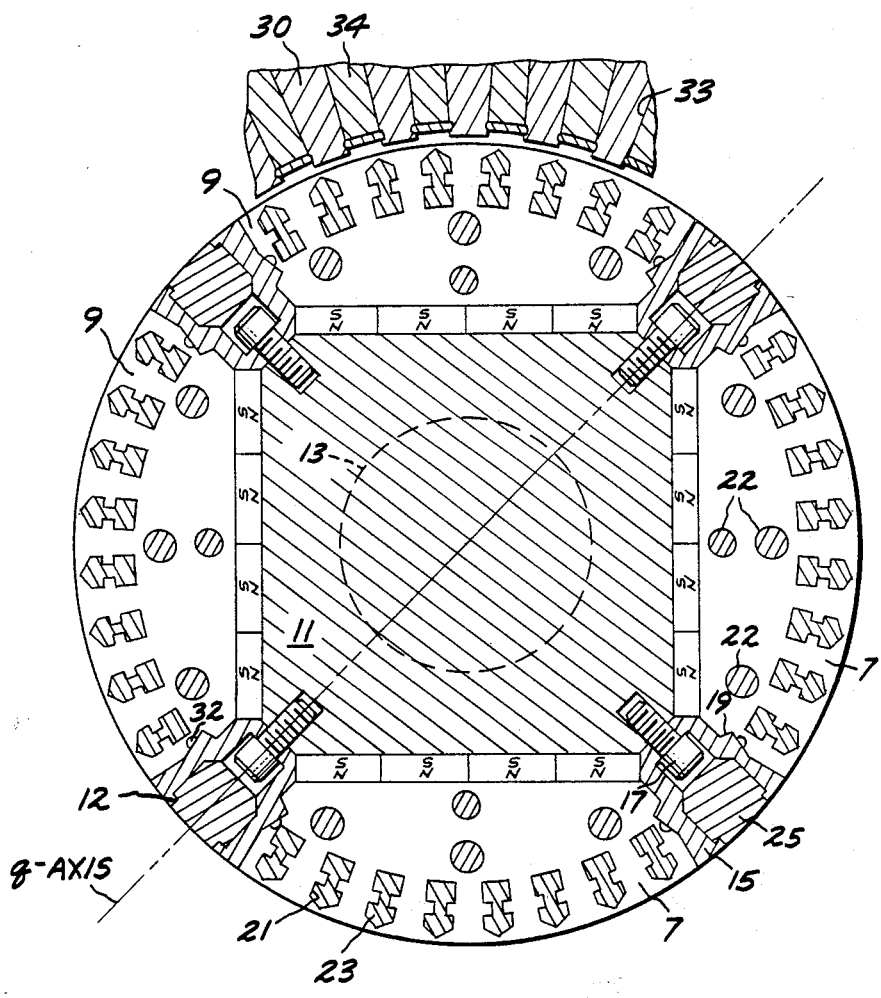
FIG. 3 is a sectional end view of an interior magnet two pole rotor with a starting cage in accordance with the present invention.

Referring now to FIG. 3, a two pole embodiment is shown having a geometry similar to the rotor of FIG. 1. The magnets on two circumferentially adjacent faces in FIG. 3 have the same direction of polarization resulting in a north pole comprising two arcuately shaped pole piece sections 7 separated by a clamp piece. Similarly, a south pole piece comprises two arcuately shaped pole piece sections 9 separated by a clamp piece. The rotor has a single quadrature axis separating the north and south pole pieces. The axially central core portion 11 has a generally polygonal cross section, shown in FIG. 3 as generally square.

Referring to FIG. 4, a six pole embodiment is shown. The central portion of the shaft has a hexagonal cross section with north and south arcuately shaped pole pieces alternately distributed circumferentially about the rotor.

Referring now to FIG. 5, which is a side view of FIG. 1 along the lines 5—5 the pole piece bars 23 and clamp piece bars 25 are seen to extend past the stack in either axial direction with the bar ends tenoned. The pole piece bars 23 are shown with two pairs of tenons 123 spaced apart in the radial direction, while the clamp piece bars 25 are shown with two pairs of tenons 123 situated circumferentially adjacent to one another with one tenon of each pair spaced radially apart from the other. The tenons are situated in matching apertures in end rings 29 of current conducting material such as aluminum. The pole piece bars, clamp piece bars and end rings when joined to form a structural and electrical connection by welding, for example, comprise a complete amortisseur. The extension of the bars beyond the pole pieces in the axial direction allows the cage to act as a radial cooling fan.

During assembly of the rotor of FIG. 1 the magnet material which can be magnetized prior to assembly is placed adjacent one of the faces of the polygonal shaped central portion with the magnets arranged so that the north seeking faces of the magnets on one face are all adjacent the central core portion and on the circumferentially adjacent face the south seeking faces of the magnet are all adjacent the core portion. Since the bolted assembly permits premagnetized magnets to be used, samarium cobalt magnets, for example, can be utilized since the flux densities required to adequately magnetize samarium cobalt magnets are higher than which can be carried in iron without saturation. Therefore samarium cobalt magnets cannot be reliably magnetized after assembly in the rotor. Pole pieces comprising a stack of stamped laminations have an electron beam (EB) weld 32 extending axially along a neutral axis of the pole piece in the vicinity of clamping ledge 19 to make the stack handling and assembly easier. The EB weld is positioned along a neutral axis to minimize distortion caused by the welding process. The laminated pole pieces are positioned adjacent to each of the magnets positioned on a face of the central core portion of the shaft.

The clamp pieces are positioned between adjacent pole pieces. Inclined surfaces of the clamp pieces engage matching surfaces of the pole pieces. An axially extending row of holes which can be seen more clearly in FIG. 2 aligns with threaded bolt holes in the central core portion. The projection 18 located on the clamp piece is positioned in an alignment slot in the central core portion. Bolts are inserted in the holes, then tightened, drawing the pole pieces radially inward, compressing the magnets. Through-bolts extend axially through holes in the lamination stampings to hold end plates 24 over the magnets.

Pole piece bars are preferably machined most of their length up to a shoulder, so that only one end of the pole piece bars can slide into the double cage slots stamped in the lamination and then only up to the shoulder. Adjacent pole piece bars are inserted into the double cage slots from opposite ends of the lamination stack to help hold the stack together. Clamp bars are slid into the channels in the clamp pieces. The ends of the pole piece bars and the clamp bars have tenons which fit into matching holes in the end rings spaced away from either end of the stack. The end rings are structurally and electrically joined to the bars to form a complete amortisseur.

The operation of the rotor will now be explained. The rotor is suitable for use with an induction machine stator 30, shown indicated in section in FIGS. 1, 3 and 4. If desired, stator slot design 33 can be adjusted to vary the area available for the copper stator windings 34, to adjust the stator current density. The stator can be excited during motoring operation by a 60 cycle three phase a.c. source, for example. The rotor has a double cage rotor bar arrangement to make the resistance and therefore the torque higher at low motor speeds when the motor is running asynchronously. The total asynchronous torque is the torque produced by the cage less the magnet braking torque due to the continuous permanent magnet excitation which cannot be "turned-off" during starting. The effective resistance and reactance of the rotor changes with the frequency experienced by the rotor causing current in the rotor bars to shift to the portion of the rotor bars closest to the rotor periphery at low speed when the frequency experienced by the rotor is high. As full speed is approached the frequency experienced by the rotor is low and the current flows in both portions of the rotor bars in proportion to their relative cross sectional areas. The low resistance at higher speeds provides good synchronization capability, allowing the motor to pull into synchronism. The most critical design point for the magnet is the point where it is exposed to maximum demagnetization. Because of the presence of the starting cage, the high current levels in the stator winding during the initial portion of the starting process will be compensated by the rotor currents, and thus not substantially affect the magnets. However, during the actual synchronization process the shielding action of the cage is limited because of the low slip levels. The magnets are exposed to maximum demagnetization when the magnetomotive forces of the magnet and the stator current are in phase opposition during the synchronization process. The magnets, however, do not have to produce any flux in this rotor position. Thus as long as the magnet is not permanently demagentized when subjected to maximum magnetization, it does not matter at what point of its demagnetization curve it operates in this rotor position. Since the magnet operating point at maximum torque is related to the maximum demagnetization point, it is desirable to have the magnet capable of withstanding high demagnetization levels, so that for maximum magnet utilization (reduction of magnet material per horsepower) the magnet operating point at maximum motor torque can be located as close to the maximum magnetic energy point of the magnet as is consistent with the motor size requirements.

If the rotor shaft is driven from an external source to obtain generator action, the amortisseur serves to provide damping of rotor oscillations. If the generator is providing power to a rectifier circuit, harmonics are introduced in the generator current and voltage by the discontinuous conduction of the rectifiers, and harmonic losses in the rotor iron are reduced by the amortisseur.

The foregoing describes a rotor for permanent magnet machine, suitable for use with machines in the 25–300 hp range and having a uniformly distributed amortisseur. The rotor is rugged and convenient to manufacture, particularly in small lots.

While the invention has been particularly shown and described with reference to several preferred embodiments thereof, it will be understood by those skilled in the art that various changes in form and detail may be made without departing from the spirit and scope of the invention.

What is claimed is:

1. A multipole interior permanent magnet rotor, comprising:

a plurality of north and south arcuately shaped pole pieces of flux conducting material;

a shaft of flux conducting material having a central portion with a generally polygonal cross section;

magnet means situated adjacent each fact of sad polygonal central portion, said north pole and south pole pieces situated adjacent said magnet means with said north and south pole pieces alternately distributed circumferentially about said central shaft portion, said magnet means polarized such that the north seeking faces of said magnet means are adjacent said north pole pieces and the south seeking faces of said magnet means are adjacent said south pole pieces;

clamp means of nonmagnetic material situated between adjacent north and south pole pieces so that the axially central portion of said shaft, said magnet means and said clamp means form a cylinder, said clamp means defining axially extending voids and said pole pieces defining axially extending slots circumferentially situated about the periphery of said cylinder;

fastening means extending through said clamp means into holes formed in the corners of said central shaft portion, said clamp pieces having inclined surfaces engaging matching surfaces on said pole pieces to force said pole pieces towards a central portion of said shaft and thereby apply compressive force on said magnets when said fastening means are tightened;

pole piece bars of current conducting material situated in said axially extending slots;

clamp piece bars of current conducting material situated in said axially extending voids; and two end rings, one of said end rings electrically joining said pole piece bars and said clamp piece bars at one axial end of said cylinder, the other of said end rings electrically joining said pole piece bars and said clamp piece bars at the other axial end of said cylinder to form a complete amortisseur.

2. The rotor of claim 1 wherein said clamp piece bars are retained in said axially extending voids by shoulders on said clamp means and each of said axially extending voids defined by said clamp means is in the shape of a channel which communicates through a narrowed opening with the exterior of said cylinder.

3. A two pole interior permanent magnet rotor, comprising:

two north and two south arcuately shaped pole piece sections of flux conducting material;

a shaft of flux conducting material having a central portion with a generally polygonal cross section;

magnet means situated adjacent each face of said polygonal central portion, said two north pole piece sections situated adjacent one another to form a north pole and said two south pole piece sections situated adjacent one another to form a south pole, said magnet means polarized such that the north seeking faces of said magnet means are adjacent said south pole pieces;

clamp means of nonmagnetic material situated between adjacent pole piece sections so that the axially central portion of said shaft, said magnet means and said clamp means form a cylinder, said clamp means defining axially extending voids and said pole pieces defining axially extending slots circumferentially situated about the periphery of said cylinder;

fastening means extending through said clamp means into holes formed in the corners of said central shaft portion, said clamp means having inclined surfaces engaging matching surfaces on said pole pieces to force said pole pieces towards a central portion of said shaft and thereby apply clamping force on said magnets when said fastening means are tightened;

pole piece bars of current conducting material situated in said axially extending slots;

clamp piece bars of current conducting material situated in said axially extending voids; and two end rings, one of said end rings electrically joining said pole piece bars and said clamp piece bars at one axial end of said cylinder, the other of said end rings electrically joining said pole piece bars and said clamp piece bars at the other axial end of said cylinder to form a complete amortisseur.

4. The rotor of claim 3 wherein said clamp piece bars are retained in said axially extending voids by shoulders on said clamp means and each of said axially extending voids defined by said clamp means is in the shape of a channel which communicates through a narrowed opening with the exterior of said cylinder.

* * * * *